United States Patent [19]
Stolzman et al.

[11] Patent Number: 5,506,009
[45] Date of Patent: Apr. 9, 1996

[54] DECORATION AND METHOD OF MAKING THE SAME

[75] Inventors: Faye M. G. Stolzman, Providence, R.I.; Suzanne Shearer, Tacoma, Wash.; Margaret Johnston, Four Oaks, N.C.

[73] Assignee: Faye M. G. Stolzman, Providence, R.I.

[21] Appl. No.: 379,297

[22] Filed: Jan. 27, 1995

[51] Int. Cl.$^6$ ........................................ A41G 1/00
[52] U.S. Cl. ........................ 428/10; 248/27.8; 428/7; 428/5
[58] Field of Search .................... 428/10, 4, 5, 7, 428/27, 92, 93, 94; 248/27.8; 47/41.01

[56] References Cited

U.S. PATENT DOCUMENTS

| | | | |
|---|---|---|---|
| 600,313 | 3/1899 | Hayes | 428/10 |
| 1,511,780 | 10/1924 | Smith | 428/10 |
| 1,611,589 | 12/1926 | Janusek | 428/10 |
| 2,028,872 | 1/1936 | Kellogg | 428/93 |
| 2,110,867 | 3/1938 | Castles | 428/92 |
| 2,200,948 | 5/1940 | Bufton | 428/10 |
| 2,499,740 | 3/1950 | Glance | 41/12 |
| 2,716,827 | 9/1955 | Mixter | 41/12 |
| 2,725,205 | 11/1955 | Wagler | 248/27.8 |
| 3,075,865 | 1/1963 | Cochran | 428/93 |
| 3,170,587 | 2/1965 | Beeber | 220/18 |
| 3,591,442 | 12/1967 | Matesi | 428/10 |
| 3,630,811 | 12/1971 | Radus | 47/41.12 |
| 3,711,048 | 1/1973 | Thalenfeld | 248/309 |
| 4,328,270 | 5/1982 | Kostovski | 428/43 |

*Primary Examiner*—Alexander S. Thomas
*Attorney, Agent, or Firm*—Salter & Michaelson

[57] ABSTRACT

A decoration, such as a wreath, of the present invention has a base with a plurality of openings formed therein and a group of flexible decorating strips which are interwoven through the openings of the base for creating an ornamental design. The end portions of the decorating strips extend from the back side of the base through adjacent openings in such a manner that they create a ruffled effect when viewing the back side of the grid. In another aspect of the invention, another group of decorating strips, each having a loop which extends through an opening, are positioned adjacent the front side of the base. A method of assembling the decoration is also disclosed.

1 Claim, 6 Drawing Sheets

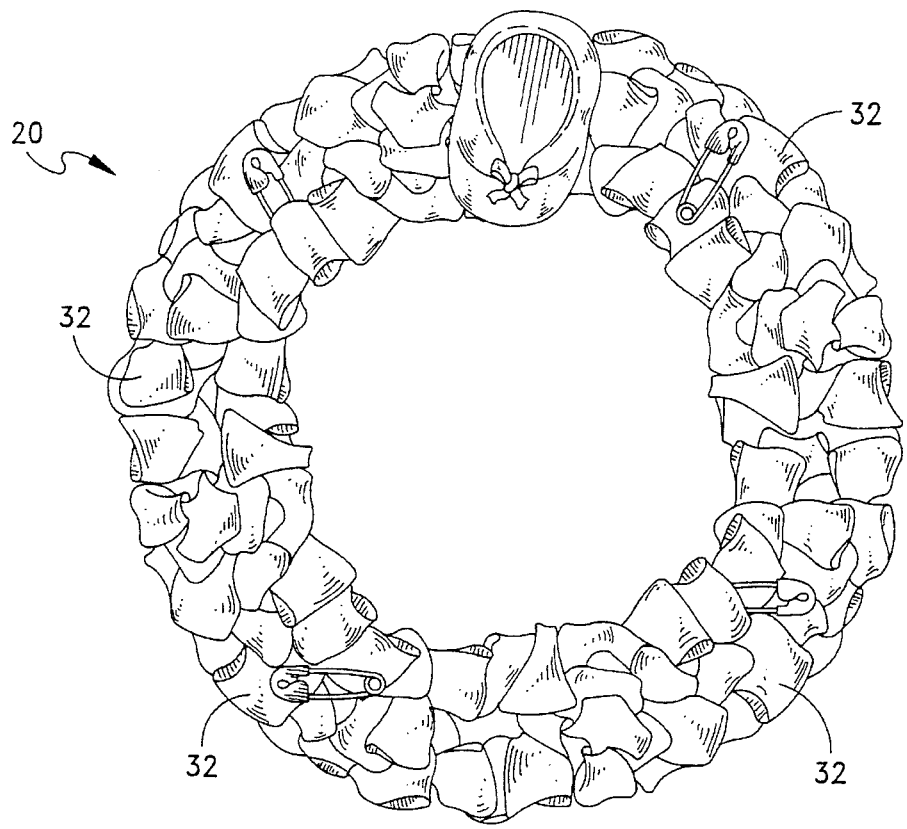
FIG. 1
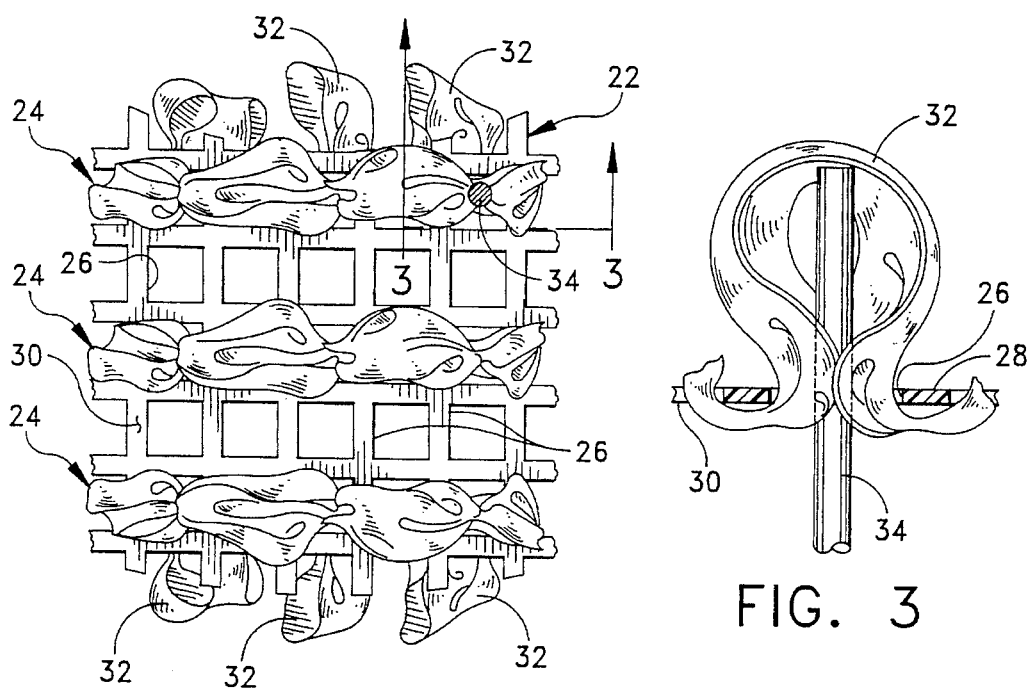
FIG. 2
FIG. 3

DECORATION AND METHOD OF MAKING THE SAME

BACKGROUND AND SUMMARY OF THE INVENTION

This invention relates generally to decorations, and more particularly to a decoration in the form of a wreath or the like which is made pursuant to a novel method.

Although there are wreath kits available having bases with openings formed therein for receiving the stems of tree boughs or flowers, none of these wreath kits include strips of flexible material which are attached to the base for creating decorative wreaths. Examples of such prior art wreath kits, and other similar constructions, may be found in U.S. Pat. Nos. 600,313 (Hayes), 1,511,780 (Smith), 1,611,589 (Janusek), 2,200,948 (Bufton), 2,499,740 (Glance), 2,716,827 (Mixter), 2,725,205 (Wagler), 3,170,587 (Beeber), 3,591,442 (Matesi), 3,630,811 (Radus), and 3,711,048 (Thalenfeld). There is presently a need for a wreath kit which is capable of utilizing other materials, such as fabric or ribbon, for giving the maker or assembler of the wreath more flexibility in designing creative wreaths and ornaments.

The instant invention provides an improved decoration, such as a wreath, comprising a base having a plurality of openings formed therein which are aligned to define a grid, and a group of flexible decorating strips which are interwoven through the openings of the base for creating an ornamental design on the front side thereof. The arrangement is such that end portions of the decorating strips extend from a back side of the base through adjacent openings in such a manner that the end portions create a ruffled effect when viewing a front side of the base. In a second aspect of the invention, another group of decorating strips, each having a loop which extends through an opening, is positioned adjacent the front side of the base. The flexible decorating strips may be selected from a group consisting of: fabric, ribbon, tissue paper, metallic paper, twisted paper, yarn, tulle, netting, and the like. Each opening of the base has a widthwise or heightwise dimension no greater than 1½ inch so that the strips frictionally engage the base for facilitating their attachment thereto. Adhesive may be provided for adhering the groups of decorating strips to the back side of the base.

The decoration of the present invention is assembled pursuant to a novel method comprising the step of pushing the decorating strips from the back side through the openings with a thin, elongate pushing member having a cross-sectional diameter smaller than the cross-sectional area of the openings. The arrangement is such that the portion of flexible decorating strip pushed through the opening and adjacent the front side forms a loop having decorative characteristics. The method also may comprise the step of pushing end portions of several decorating strips through adjacent openings with the elongate member. Under this arrangement, the end portions of the decorating strips extend from the back side of the base through adjacent openings in such a manner that the end portions create a ruffled effect when viewing the front side of the grid.

Accordingly, among the several objects of the present invention are the provision of an improved decoration having a group of flexible decorating strips which give the assembler of the decoration a variety of design options; the provision of such a decoration which is simple in design and construction; and the provision of such a decoration which is attractive in appearance.

Also among the several objects of the present invention is the provision of a method for assembling a decoration which is uncomplicated and easy to follow.

Other objects, features and advantages of the invention shall become apparent as the description thereof proceeds when considered in connection with the accompanying illustrative drawings.

BRIEF DESCRIPTION OF THE DRAWINGS

In the drawings which illustrate the best mode presently contemplated for carrying out the present invention:

FIG. 1 is a front elevational view of a decoration of the present invention illustrating one preferred embodiment;

FIG. 2 is an enlarged fragmentary rear view of the decoration illustrated in FIG. 1 with a thin, elongate pushing member being illustrated in cross section;

FIG. 3 is a further enlarged cross-sectional view taken along line 3—3 in FIG. 2 illustrating a method of attaching flexible decorating strips to a base;

Corresponding reference numerals designate corresponding parts throughout the several views of the drawings.

DETAILED DESCRIPTION OF THE PREFERRED EMBODIMENTS

Figure 4:
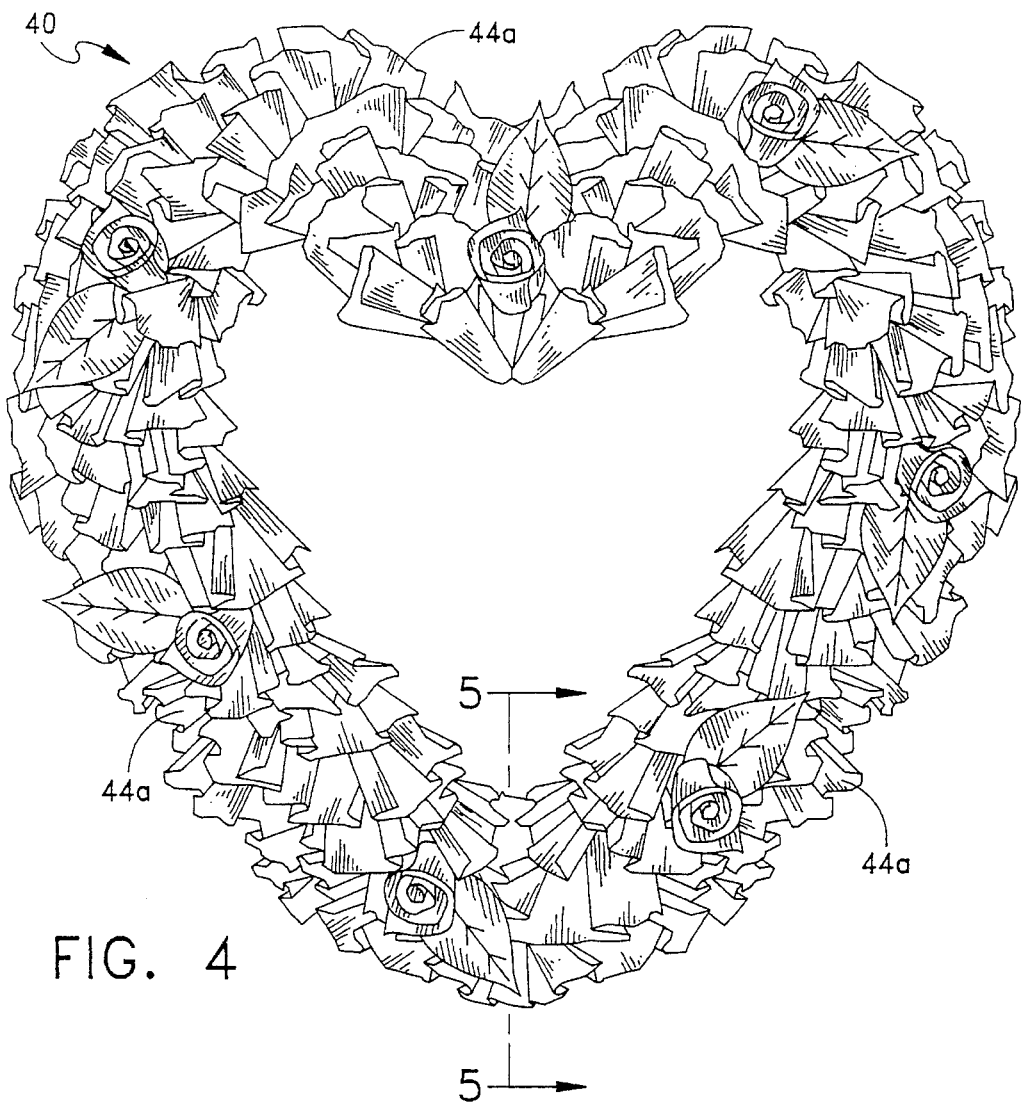
FIG. 4 is a front elevational view of a decoration of another preferred embodiment.

Referring now to the drawings, and particularly to FIGS. 1–3, there is generally indicated at 20 a decoration of the present invention illustrating a first preferred embodiment. As illustrated in FIG. 1, the decoration 20 is in the form of a circular-shaped wreath suitable for hanging. It should be understood that the decoration 20 may embody many different and varying objects other than wreaths, such as tapestries, centerpieces, wall hangings, hair ornaments (bows and barrettes) and the like, without departing from the spirit and scope of the present invention.

As shown in FIGS. 1–3, the wreath 20 comprises an annular-shaped base base, generally indicated at 22, preferably formed from plastic (via an extrusion process) which is transparent and flexible, and a group of flexible decorating strips, each strip being generally indicated at 24. Although the base 22 is fabricated from plastic, it is envisioned other suitable materials may be used as well, such as metal, wood, or cardboard. The base 22 has a plurality of openings 26 (FIG. 2) formed therein which are arranged in rows and columns to define a grid. The openings 26 of the base 22 are generally rectangular (or square as illustrated throughout the drawings) and preferably have a widthwise and heightwise dimension no greater than 1½ inch and most preferably no greater than ⅜ inch. The reason for the openings 26 being relatively small will become apparent as the description of the wreath 20 proceeds. The base 22 further includes first and second opposing sides 28, 30 wherein when assembling the wreath 20 it is unimportant which side constitutes the front side or back side.

The flexible decorating strips 24 are preferably strips of material having a thin cross section, the strips 23 being selected from a group consisting of: fabric, ribbon (wired and unwired), paper, tissue paper, metallic paper, yarn, tulle, netting, lace, LaPouf® Mylar and the like. As shown in FIGS. 1–3, the decorating strips 24 each have a loop 32 which extends through an opening 26. Each loop 32 is positioned adjacent the front side 28 and the ends of the loop 32 extend through their respective opening 26 and are positioned adjacent the back side 30.

In assembling the decorating strips 24 with the base 22, a preferred method of attaching each decorating strip 24 to the base 22 is by laying the decorating strip 24 along a group of openings 26 on the back side 30 of the base 22 and pushing portions of the decorating strip 24 through adjacent or sequential openings 26 to form the loops 32 at the front side 28 of the base 22. The thickness and rigidity of the decorating strips 24 will determine whether each opening 26 along a group of openings or sequential openings will receive the loop 32 of fabric therein. The pushing action may be accomplished with a thin, elongate pushing member 34 having a cross-sectional diameter (e.g., ¼ inch) smaller than the cross-sectional area of the opening. As illustrated in FIG. 2, three such decorating strips 24 are attached to the base 22 of the wreath 20 which has five rows of circular openings 26. As shown, the outer rows and middle row of openings 26 receive decorating strips 24 therein wherein every other opening 26 in a row receives a portion of the decorating strip 24 which forms a loop 32. It has been found that this arrangement sufficiently covers and conceals the base 22 when viewing its front side 28.

For relatively rigid decorating strips 24 (e.g., constructed of thick fabric) which are difficult to manipulate through the openings 26 in the base 22, another preferred method of attaching each decorating strip 24 to the base 22 is by laying the decorating strip 24 along a group of openings 26 on the front side 28 of the base 22 and pushing smaller portions of the decorating strip 24 with the pushing member 34 through adjacent or sequential openings 26 to form the relatively small loops (or tuck) at the back side of the base. These small portions of the decorative strips 34 which extend through the openings 26 to the back side 30 of the base 22 are provided for securing each strip 24 thereto. Although this arrangement is not illustrated in the drawings, it follows the same principles used when forming loops 32.

The wreath designer, when assembling the wreath 20, may use any number of different types of decorating strips 24 (e.g., different materials, various colors, etc.) to achieve an attractive design. It is within the wreath designer's discretion in determining the length of the loops 32, location of the loops 32 and the pattern of forming the loops 32. With most materials, the friction between the decorating strips 24 and the edges of the base 22 which define the openings 26 through which the strips 24 extend to form the loops 32 secures the strips 24 to the base 22. However, in order to ensure each decorating strip 24 maintains its attachment to the base 22, adhesive may be applied to the portions of the decorating strips 24 engaging the back side 30 of the base 22 in a suitable manner, e.g., with a glue gun. The adhesive also ensures that the loops 32 are maintained at their desired length.

Figure 5:
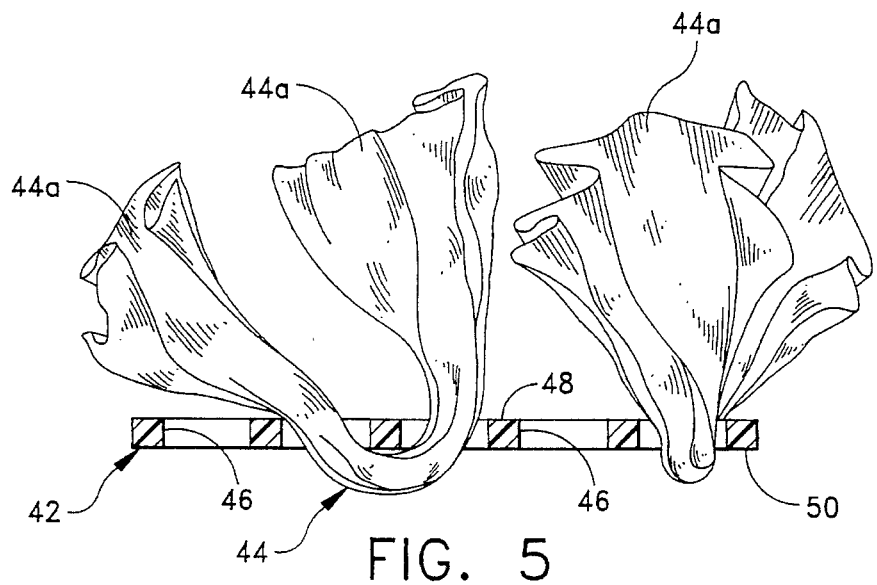
FIG. 5 is an enlarged cross-sectional view taken along line 5—5 in FIG. 4 illustrating another method of attaching the decorating strips to the base.
Figure 6:
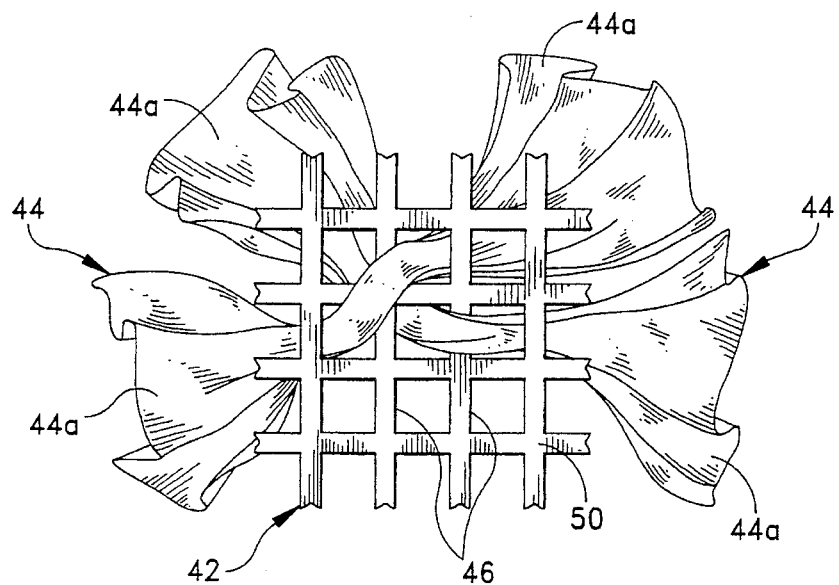
FIG. 6 is an enlarged fragmentary rear view illustrating yet another method of attaching the decorating strips to the base.

Turning now to FIGS. 4–6, there is illustrated a wreath of another preferred embodiment, generally indicated at 40, having a base, generally indicated at 42, which is identical in construction to base 22 of wreath 20 but is heart-shaped instead of circular-shaped. Wreath 40 also includes a group of flexible decorating strips, each generally indicated at 44, which are shorter in length than decorating strips 24 of wreath 20 but otherwise identical to decorating strips 24. As shown, the flexible decorating strips 44 are interwoven through openings 46 of the base 42 wherein the end portions 44a of each strip 44 extend from a back side 50 of the base 42 through adjacent openings 46 to the front side 48 in such a manner that the end portions 44a create a ruffled effect when viewing the front side 48 of the base 42. As with wreath 20, the decorating strips 44 of wreath 40 may be adhered with suitable adhesive to the back side 50 of the base 42.

FIG. 5 illustrates the decorating strips 44 being interwoven in the base 42 in such a manner that the end portions 44a of each strip 44 extend through adjacent openings 46. As between adjacent strips 44, there is a free (unoccupied) opening 46 therebetween. FIG. 6 illustrates the decorating strips 44 being interwoven in the base 42 in an identical fashion except the adjacent strips 44 are crisscrossed with respect to each other. These are just two examples of the many different ways the decorating strips 44 may be interwoven in the base 42 to achieve attractive designs.

It should be noted that the wreaths 20, 40 of FIGS. 1–6 can include decorating articles other than decorating strips 24, 44, respectively. It is envisioned that other articles, such as flowers (which are illustrated in FIG. 4), tree boughs, shredded grass, ornaments, dolls, diaper pins and baby shoes (which are illustrated in FIG. 1) can easily be attached to the base 22, 42 of respective wreath 20, 40 in any suitable manner.

Figure 7:
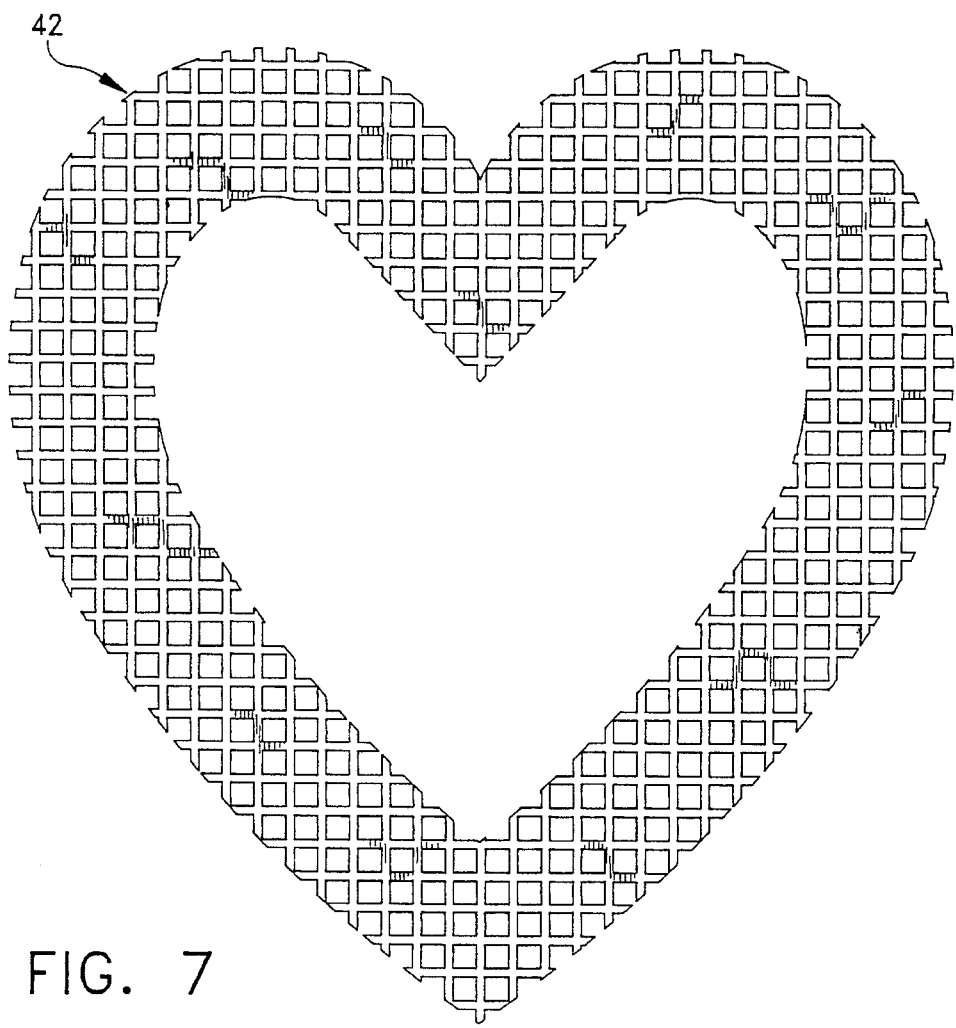
FIGS. 7–11 are elevational views of bases having various shapes.
Figure 8:
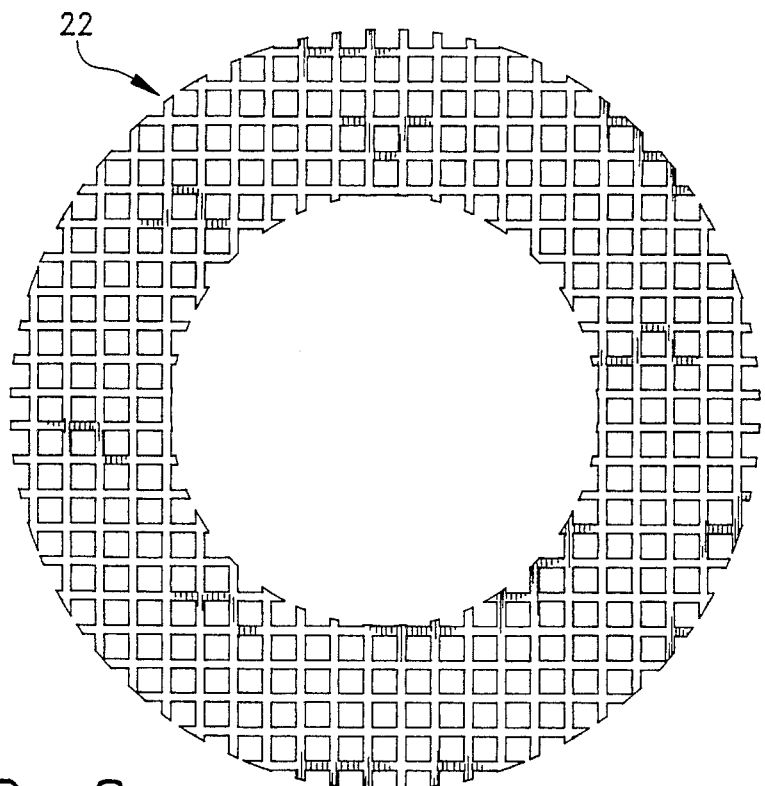
Figure 9:
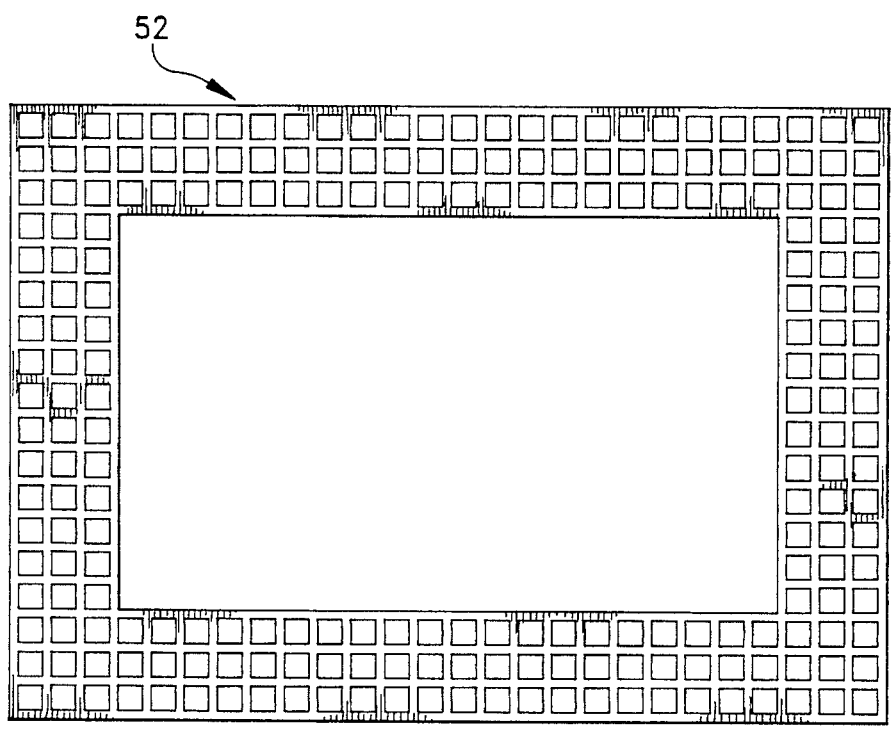
Figure 10:
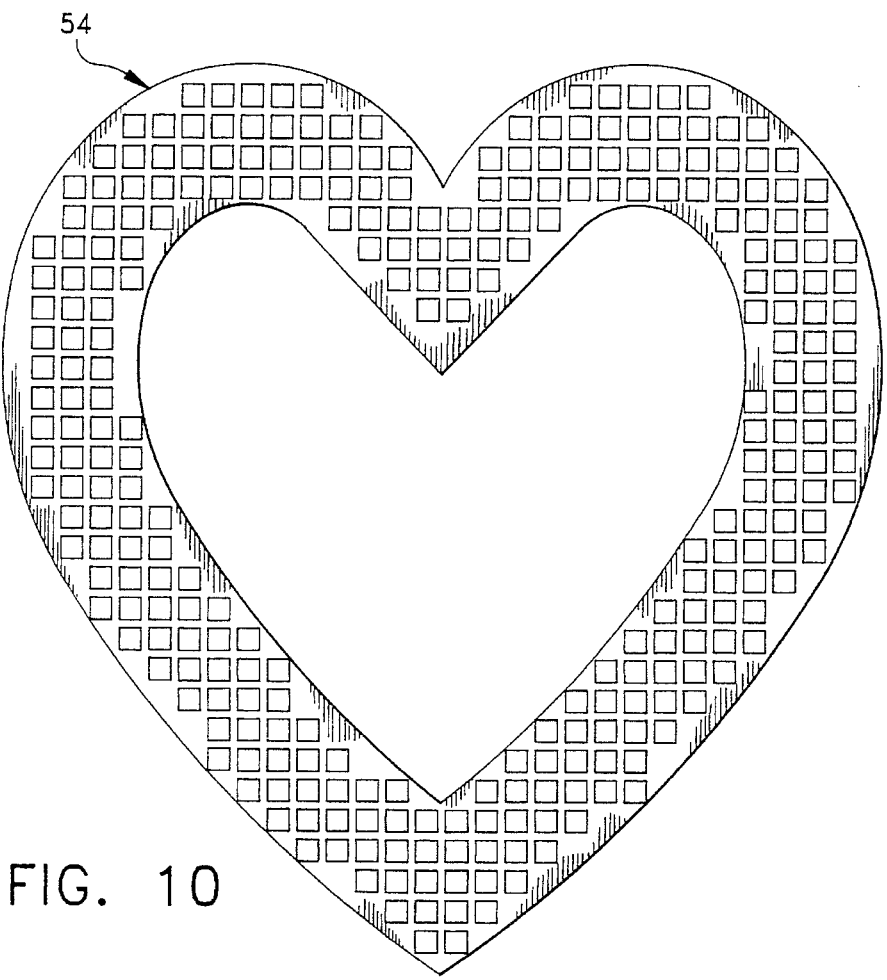
Figure 11:
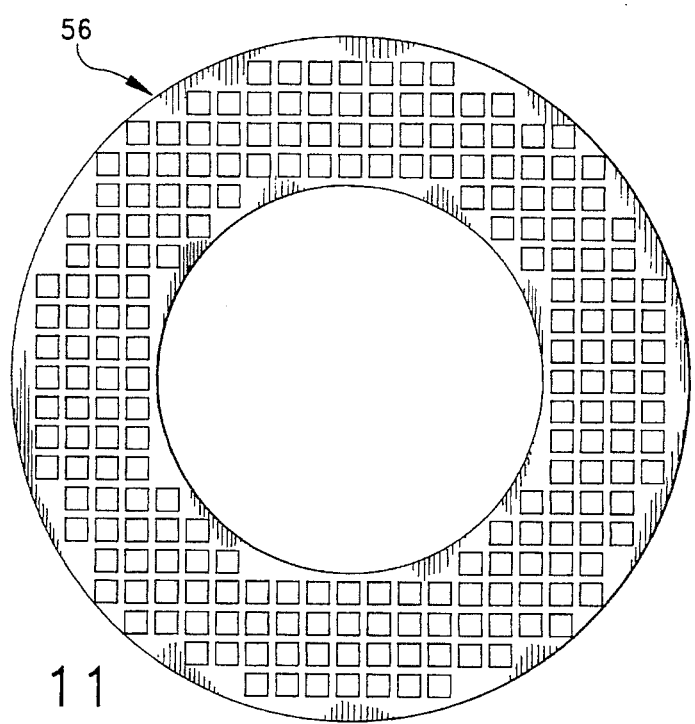

FIGS. 7–11 illustrate bases configured to have varying shapes. More particularly, FIG. 7 shows the heart-shaped base 42 used in assembling the wreath 40 shown in FIG. 4, and FIG. 8 shows the circular-shaped base 22 used in assembling the wreath 20 shown in FIG. 1. It should be noted that the bases 42, 22 of FIGS. 7 and 8, respectively, are not formed to have clean edges, but are stamped or cut from blanks. FIGS. 9–11 illustrate a rectangular-shaped base 52, heart-shaped base 54 and circular-shaped base 56, respectively. As shown in these drawing figures, the bases 52, 54, and 56 have clean edges which result from being fabricated from an extrusion process.

Figure 12:
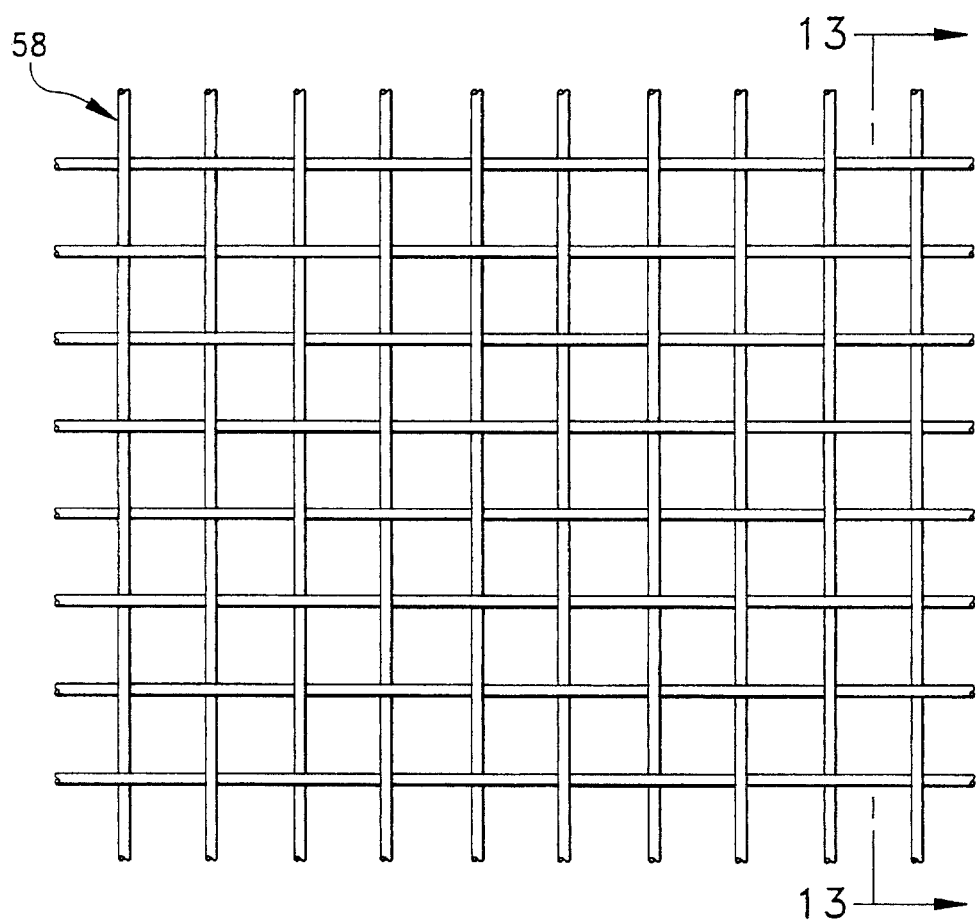
FIG. 12 is an enlarged fragmentary view of a base constructed from wire.
Figure 13:
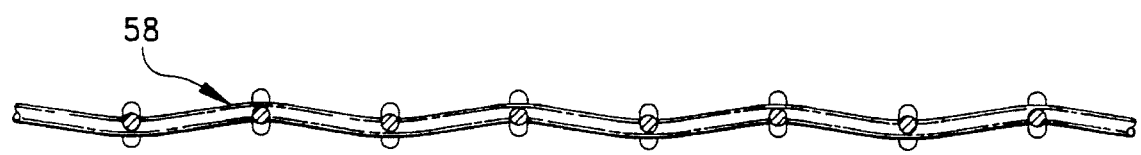
FIG. 13 is a cross-sectional view taken along line 13—13 in FIG. 12.

FIGS. 12 and 13 illustrate a portion of a base 58 constructed from wire. This material is suitable for applications where it is desired to increase the strength of a wreath constructed with base 58.

It should be noted that the wreaths of the several embodiments are easily assembled pursuant to the method of the present invention which involves using the elongate pushing member 34 for pushing portions of the decorating strips through adjacent or sequential openings to form the loops or the ruffled effect as desired. It should also be noted that the wreath designer assembling the wreaths has many design options since she is not limited to articles having stems, such as tree boughs or the like, but may choose from a wide assortment of materials, such as fabric, ribbon, tissue paper, metallic paper, twisted paper, yarn, tulle, and netting.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A decoration comprising:

an annular-shaped base having a plurality of preformed, discrete openings formed therein having a widthwise and heightwise dimension of about ⅜ of an inch and which are aligned to define a predetermined grid having a design, and first and second opposing sides, said base being fabricated from plastic material;

a group of flexible decorating strips which are interwoven through the openings of the base for creating an ornamental design on the front side thereof, each decorating strip having end portions extending from the back side of the base through adjacent openings to the front side of the base in such a manner that the end portions of several decorating strips create a ruffled effect when viewing the front side of the base; and another group of decorating strips each having a plurality of loops which extend through openings of the base, each loop being positioned adjacent said front side of the base so that it is visible when viewing the front side of the base, said two groups of strips each being fabricated from ribbon material having a thin cross section.

* * * * *